(12) United States Patent
Ehsani

(10) Patent No.: US 11,746,546 B1
(45) Date of Patent: Sep. 5, 2023

(54) EXTERNAL ONSITE-MANUFACTURED CONTINUOUS STRUCTURAL SLEEVE

(71) Applicant: Mohammad Reza Ehsani, Tucson, AZ (US)

(72) Inventor: Mohammad Reza Ehsani, Tucson, AZ (US)

( * ) Notice: Subject to any disclaimer, the term of this patent is extended or adjusted under 35 U.S.C. 154(b) by 0 days.

(21) Appl. No.: 18/099,165

(22) Filed: Jan. 19, 2023

(51) Int. Cl.
    *B29C 53/60*     (2006.01)
    *E04G 23/02*     (2006.01)
    *B29C 53/56*     (2006.01)
    *B29C 53/58*     (2006.01)
    *B29C 53/68*     (2006.01)

(52) U.S. Cl.
    CPC ........ *E04G 23/0218* (2013.01); *B29C 53/562* (2013.01); *B29C 53/582* (2013.01); *B29C 53/60* (2013.01); *B29C 53/607* (2013.01); *B29C 53/68* (2013.01)

(58) Field of Classification Search
    CPC ..... B29C 53/562; B29C 53/582; B29C 53/60; B29C 53/607
    See application file for complete search history.

(56) References Cited

U.S. PATENT DOCUMENTS

| | | | | |
|---|---|---|---|---|
| 9,375,782 | B2 * | 6/2016 | McBrien | F01D 9/065 |
| 2016/0053922 | A1 * | 2/2016 | Ehsani | B29C 53/00 |
| | | | | 156/173 |

* cited by examiner

*Primary Examiner* — Alison L Hindenlang
*Assistant Examiner* — Alexander A Wang
(74) *Attorney, Agent, or Firm* — Arjomand Law Group, PLLC

(57) ABSTRACT

Methods and systems are disclosed for encasing various structures with a seamless continuous sleeve, where the presence of existing supports does not allow slipping a sleeve over the structure. In these methods strips of fabrics smeared with or saturated by resin are helically or non-helically wrapped or placed around desired shape mandrels that are located around a support of the structure. As the resin is partially cured, a portion of the sleeve segment is moved away from the mandrel, leaving the rest of the sleeve on the mandrel to be attached to the next will-be-fabricated sleeve segment. The process will continue as many times as needed to create a sleeve of a desired length. In various embodiments the strength of the sleeves varies at different locations. In some embodiments the gaps between the sleeves and the structures are filled with gas, liquid, solid, or any other materials.

20 Claims, 10 Drawing Sheets

EXTERNAL ONSITE-MANUFACTURED CONTINUOUS STRUCTURAL SLEEVE

CROSS-REFERENCE(S) TO RELATED APPLICATION(S)

This Non-Provisional Patent Application is related to the U.S. Provisional Patent Application No. 63/221,005 entitled "EXTERNAL CONTINUOUS STRUCTURAL SLEEVE," filed on 13 Jul. 2021 and to U.S. Non-Provisional patent application Ser. No. 15/684,928, entitled "ONSITE REAL-TIME MANUFACTURING OF LONG CONTINUOUS JOINTLESS PIPES," filed on 23 Aug. 2017, U.S. patent Ser. No. 10/436,350 entitled "TRENCHLESS PIPE-LAYING," and U.S. patent Ser. No. 10/571,052, entitled "METHOD AND APPARATUS FOR MINING COPPER," the disclosures of all of which are hereby expressly incorporated by reference in their entirety.

TECHNICAL FIELD

This application relates generally to building a structural sleeve around an existing elongated structure. More specifically, this application relates to a method for on-site construction of continuous FRP sleeves for encasement and protection of wires, cables, pipes, piles and the like.

BRIEF DESCRIPTION OF THE DRAWINGS

The drawings, when considered in connection with the following description, are presented for the purpose of facilitating an understanding of the subject matter sought to be protected.

DETAILED DESCRIPTION OF THE PREFERRED EMBODIMENT

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using FRP (Fiber Reinforced Polymer) to construct the structural sleeve or conduit, it will be appreciated that the disclosure may include other curable and other reinforcement materials such as resin and various non-metallic or plastics such as HDPE, PVC, rubber, etc., to which the disclosed methods also apply.

The disclosed methods teach the on-site manufacturing of lower cost, safer and environmentally sustainable conduits using the FRP technology. The example sleeves or conduits in this specification are basically made of layers of FRP straps wrapped around a mandrel where the mandrel itself is placed around an elongated structure. Elongated structure (hereafter referred to as ES) is defined as those structures whose ends are connected to other structures, making it impossible to slip a seamless sleeve or conduit over them. Examples of ES include wires or cables, pipelines, columns or piles, etc. These ES often require to be encased in a sleeve or shell for strengthening, protection, etc.

An objective of this innovation is to eliminate the need to disconnect the ends of these ES. With the proposed innovation, a continuous one-piece sleeve or conduit can be manufactured onsite directly around the ES and pulled over it while the ES remains in service. This will greatly reduce the project cost and eliminate disruption of service during the installation process.

Throughout this specification, the term "filler material" refers to any solid, liquid or gas, such as resins, grout, concrete, foam, compressed air and the like that are used to fill the intentionally designed empty annular space between the sleeve and the ES. Moreover, in the following disclosure, the terms casing, sleeve, tube, jacket, shell, conduit, etc. may be used interchangeably and they all refer to a structure that is built to surround an existing ES.

Figure 1A:
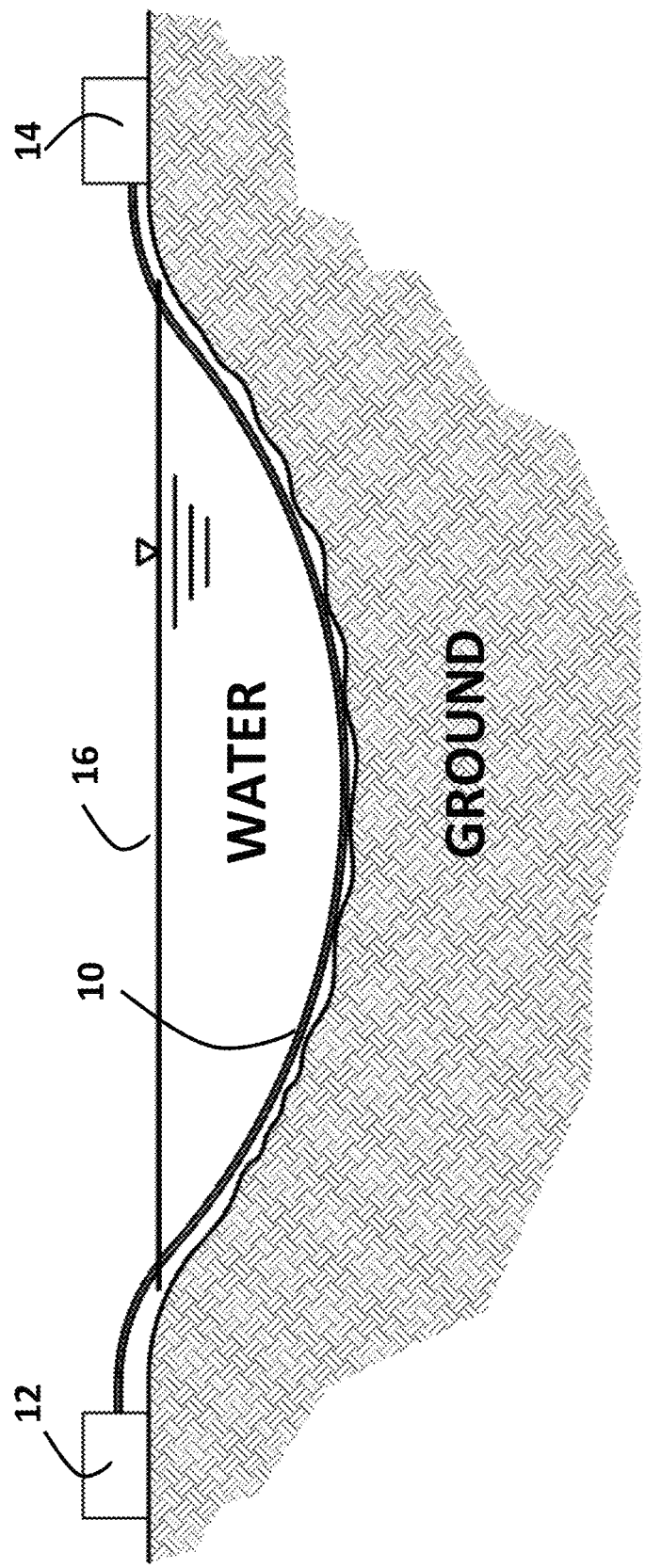
FIGS. 1A, 1B and 1C show example elongated structures that can be encased according to the disclosed methods.
Figure 1B:
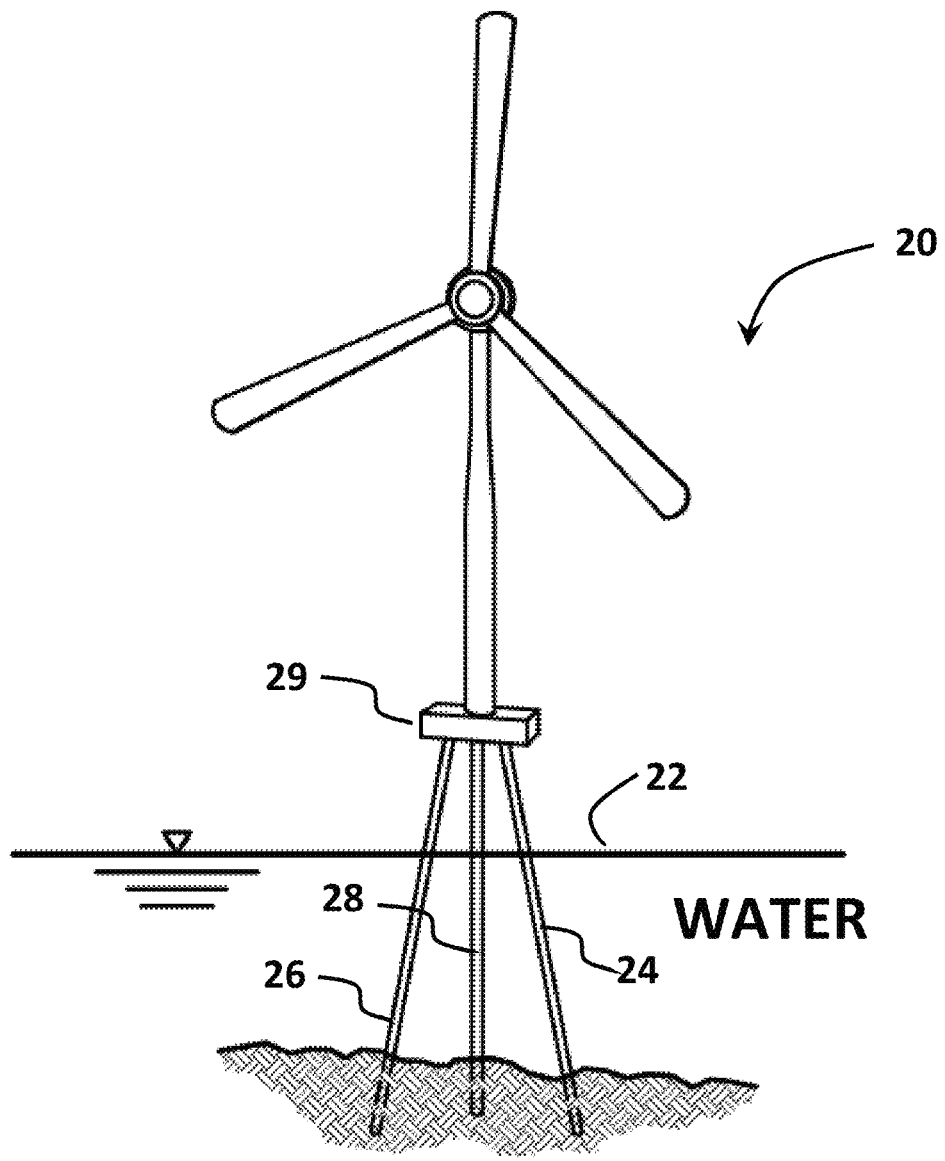
Figure 1C:
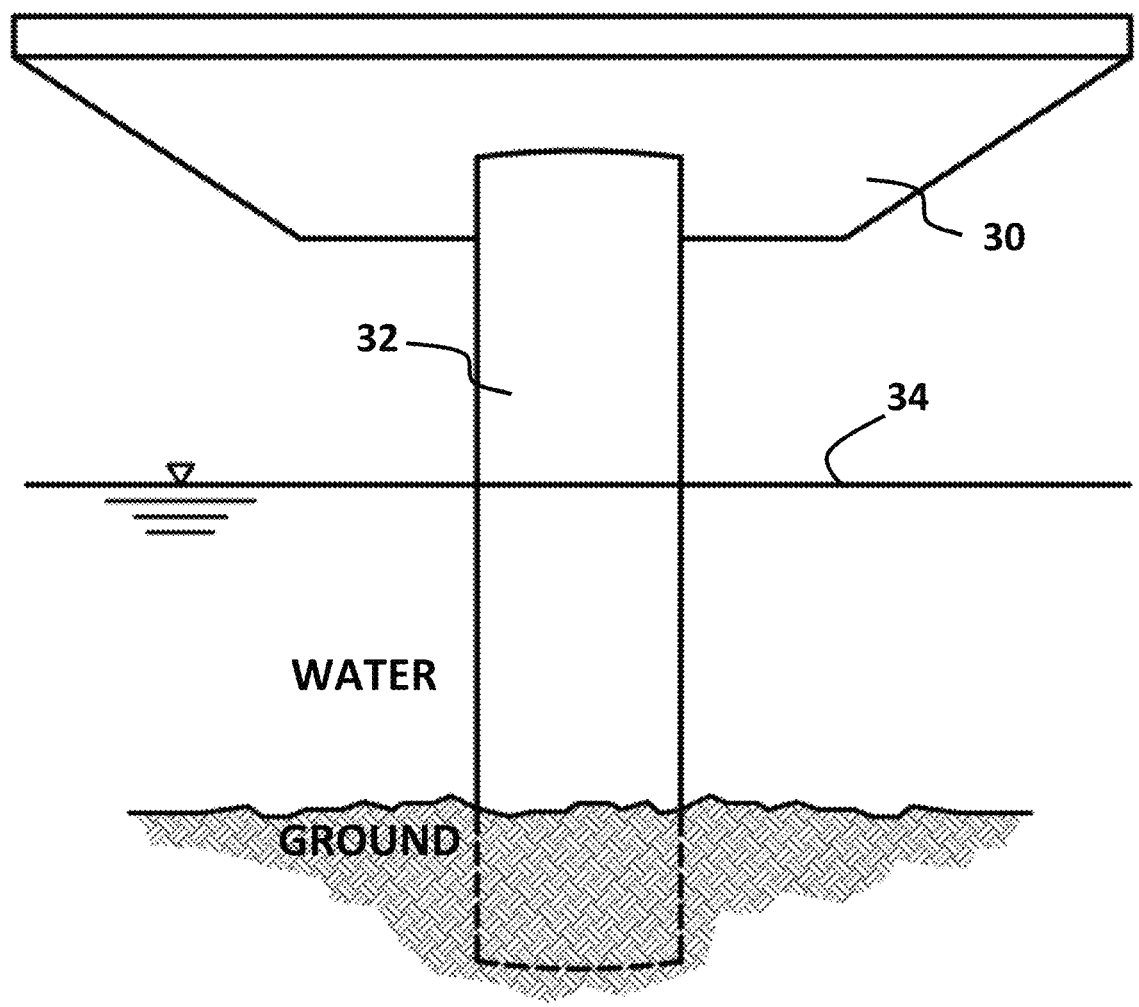

FIG. 1A shows an example ES in the form of cables 10 crossing a body of water such as an ocean 16 where the presence of structures 12 and 14 at the ends of the cables 10 prevent slipping a continuous and seamless tube over the cables 10. FIG. 1B shows a wind turbine 20 over a body of water 22 and supported on another example ES piles 24, 26 and 28, where the presence of the slab 29 prevents slipping a continuous tube over the piles 24, 26 and 28. FIG. 1C represents a bridge deck 30 supported on yet another example ES column 32 over a body of water such as a river 34 where the presence of the bridge deck 30 prevents slipping a continuous sleeve or shell over the ES column 32.

Figure 2A:
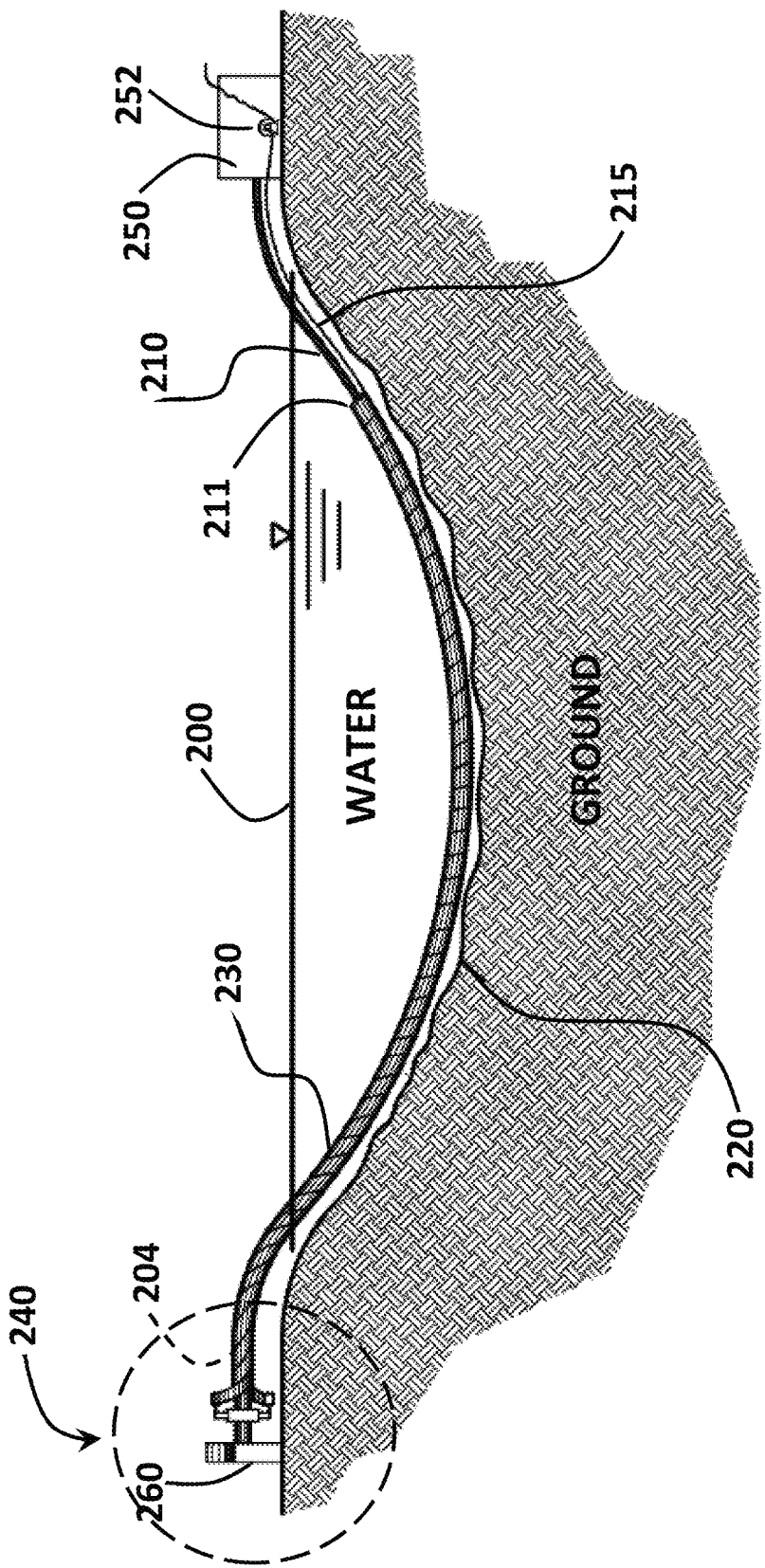
FIGS. 2A, 2B and 2C illustrate a bundle of cables crossing a body of water that is being encapsulated in a casing according to the disclosed methods.

Electrical and fiber optics cables are commonly placed at the bottom of oceans to transmit data and financial transaction records, etc. A decade ago, the US Federal Reserve estimated that every day 10 trillion dollars was being transmitted through this underwater network. FIG. 2A shows a bundle of cables 210 resting near the bottom 220 of the ocean 200. The ends of the cables 210 are connected to structures 250 and 260 such that it becomes impossible to slip a seamless continuous sleeve over the cable 210 from either end. In this example embodiment, a mandrel 204 having an outside diameter equal to the internal diameter of the sleeve 230 that is being manufactured is placed near one end of the cables 210.

Figure 2B:
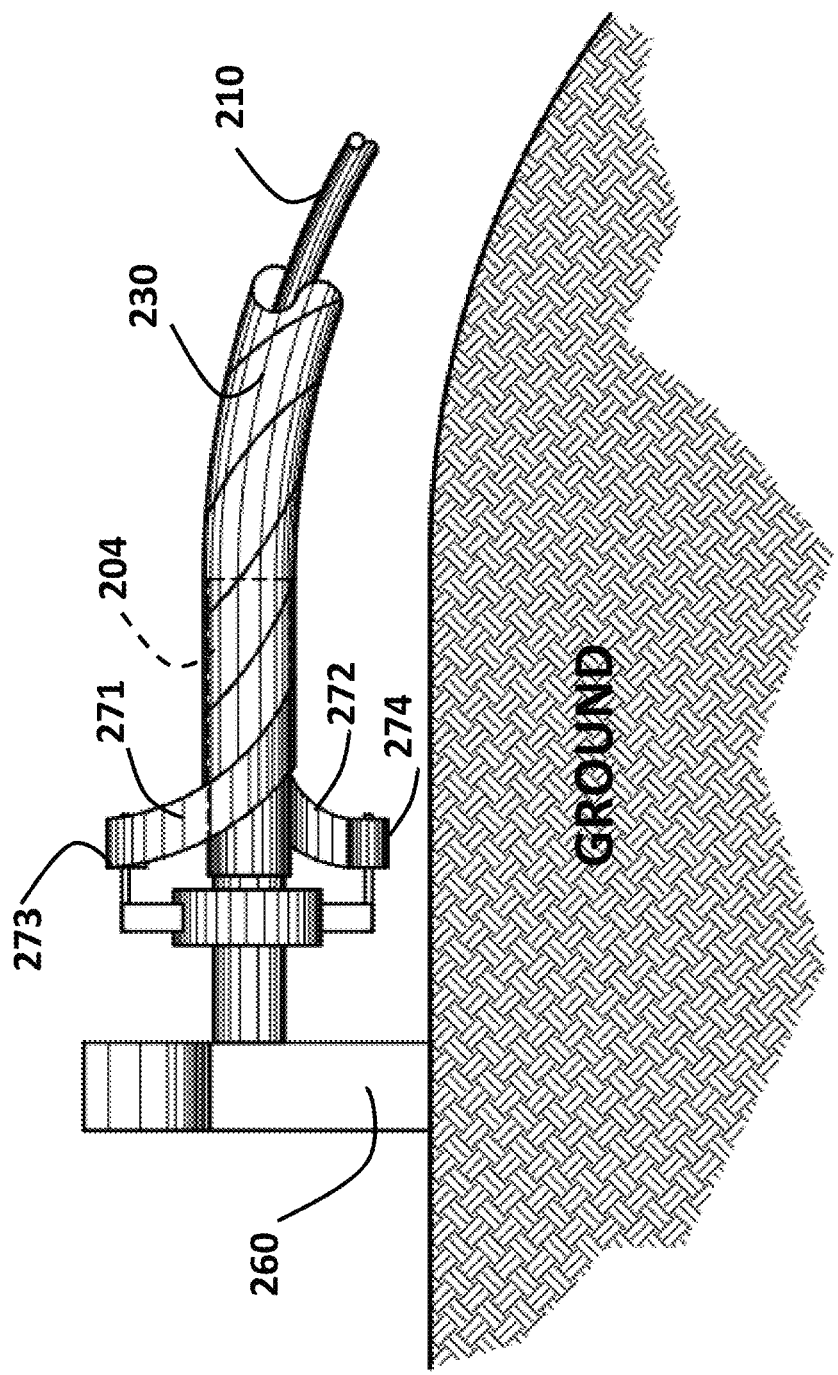

FIG. 2B shows a closeup view of region 240 of FIG. 2A. Various layers of resin-saturated carbon or glass FRP fabric 271 and 272 are wrapped helically or non-helically (in overlapping individual bands) around the mandrel 204. The fabric strips 271 and 272, in some embodiments, may be unwound from one or more spools 273 and 274 that can revolve around mandrel 204. In one embodiment the resin can cure very fast (for example in about 3 minutes at a temperature of 300 F). This allows the wrapped FRP layers to become a hard sleeve or tube 230 in a few minutes.

In some embodiments additional strips of reinforcement materials may be longitudinally placed between the wrapped layers of the sleeve 230. In other embodiments sheets of reinforcement materials may be wrapped, non-helically between, under, and/or over the wrapped layer(s) of the shell 230. In some embodiments there may not be any other wrappings except for these non-helical wrappings of these sheet materials. Such non-helically wrapped sheets of reinforcement materials may overlap each other along the longitudinal axis of the sleeve 230. In all the overlapping wrappings, helical or non-helical, the percentage of the overlap is adjusted, by engineering calculations, at least based on the material properties and the required strengths of the sleeve 230.

The formed sleeve or casing 230 is subsequently slipped off the tapered or non-tapered mandrel 204 over the cables 210, but the upper end of the sleeve 230 is kept on the mandrel 204. In some embodiments a slight taper in the mandrel facilitates the removal of the sleeve 230 without noticeable change in the cross section of the sleeve. In various embodiments a number of spacers may be attached inside the finished portion of the sleeve to keep the desired distance between the inner surface of the sleeve 230 and the outside surface of the cables 210. The process of wrapping layers of FRP 271 and 272 continues and is repeated for as long as it is needed in one or more directions to create a continuous sleeve 230 of desired length.

In some embodiments, as illustrated in FIG. 2A, a cable or chain 215 may be attached to the free end 211 of the sleeve 230 and pull the finished sleeve 230 towards the end point 250 either manually or using a motorized winch or stepping motor 252 or similar devices. The cable 215 and sleeve 230 are controllably pulled into the ocean, for example, by stepping motor 252. Cable 215 helps to gradually and completely pull the sleeve 230 over the cables 215, where the rate of pulling is substantially the same as the rate of formation of sleeve 230 using manual, mechanical, or computer-controlled devices.

Figure 2C:
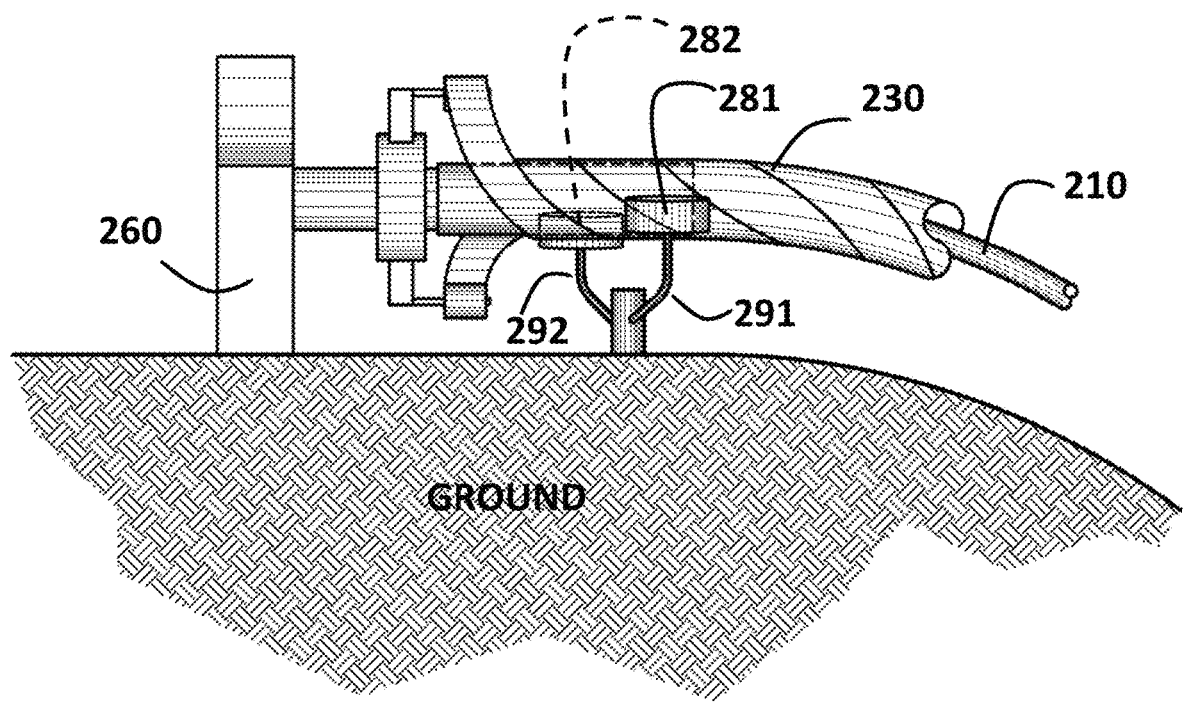

In other embodiments the finished sleeve 230 may be pushed towards the end 250. FIG. 2C is a closeup view of region 240 of FIG. 2A. In this example, rubber wheels 281 and 282 are supported on arms 291 and 292, respectively. These wheels are pressed hard against the sleeve 230; as the wheels rotate, the friction force pushes the finished sleeve towards the end 250. The turning of the wheels can be automated to be synchronized with the rate at which the sleeve 230 is being manufactured. In other embodiments, the wheels can engage periodically to push the sleeve 230 after a sufficient length of sleeve has been produced and disengage while additional sleeve lengths are being made.

In various embodiments, depending on the method of the formation of the sleeve 230, the pulling of the sleeve 230 over the cables 210 may be continuous or in steps. For example, the sleeve 230 may be continuously pulled as the strips 271 and 272 are being wound around mandrel 204 or the sleeve 230 is only moved if the entire length of mandrel 204 is wound around. In other embodiments the spools 273 and 274 may also travel back and forth on the mandrel 204 (In both cases the spools can go back and forth). In the former case the turning of the spools 273 and 274 around the mandrel 204 and the pulling of the cable 215 may be synchronized and the faster the strips 271 and 272 are wound around mandrel 204, the faster the sleeve 230 is pulled onto the cables 210.

Predetermined directions of the fibers of the strips 271 and 272 and/or placement of additional longitudinal strips between the wrapped strips along the entire length or some sections of sleeve 230 will provide additional strength for sleeve 230. For example, the portions of the sleeve 230 at the bottom of the ocean, where the hydrostatic pressure is larger, may be built with additional fiber or fabric layers to yield higher strength. In some embodiments after the sleeve 230 is laid as desired, the annular space between the sleeve 230 and the cables 210 is filled with filler materials such as grout, concrete, foam, resin, pressurized gas and the like. In various embodiments the ends of the annular space may be sealed with clamps, or an expansive grout and the like before it is filled with a filler material.

In various embodiments, to allow the placement of the mandrel around the elongated structure, a segmental mandrel can be used. These segmental mandrels, for example, can be two half cylinders that can be connected along the edge to create a full cylindrical mandrel around the ES. Similarly, a clam shell type mandrel can be opened up, placed around the ES, and closed to create a mandrel that goes all around a segment of the ES. These mandrels can be dismantled and removed once the manufacturing of the sleeve is complete. In various embodiments, the segmental mandrel can be noncircular such as a rectangle, ellipse and the like to create a sleeve of any desired shape and cross-section.

In some embodiments a newly wound sleeve segment can be resting on the mandrel while it is cured and then partially slipped off. In other embodiments, the process will be continuous and while the FRP layers are being wrapped on one part of the mandrel, the wrapped portion on another part of the mandrel is being cured.

In various embodiments, the saturation of the fibers or fabric may be performed before, during or after the fibers or fabric are wrapped around the mandrel. In some embodiments a special pre-impregnation technique of the fabric with resin, commonly referred to the industry as "pre-preg" may be preferred. Wrapping the mandrel with a pre-preg fabric eliminates the need for carrying resin to the construction site for the purpose of saturating the fabric.

In some embodiments, the length of the mandrel is significantly shorter than the length of the ES and it is possible to replace a mandrel with a different one for fabricating different sections of the sleeve. Mandrels made with cardboard, plastic, inflatable tube, etc. can be used to manufacture the last few feet of the sleeve and these can be left in place or removed from inside the shell once the manufacturing of the shell or sleeve is complete.

In some embodiments the annular space between the sleeve 230 and the cable 210 may be filled with various filler materials. These could be reinforcing materials or a hardening material such as concrete or grout that will prevent vandals or ship anchors and the like to cut the cable easily.

Another use of the disclosed methods is the encasement of high voltage cables. These cables that are often buried underground become very hot and require encasement in a heat-dissipating conduit to minimize their impact on the surrounding environment. In steps similar to those described above a continuous sleeve may be manufactured around these cables without disruption of service. The annular space between the high voltage cable and the sleeve can be filed with a desired heat dissipating filler.

Another sample embodiment is illustrated with reference to FIG. 3. Submerged piles and columns supporting bridges, offshore wind turbines, etc. corrode and require repair. Encasing these structures in a shell made with FRP is an effective technique to repair or strengthen these elements. Currently divers must perform the repair underwater, which adds significant cost and safety concerns to the project, especially when the piles are in deep waters. Furthermore, in repair of most submerged piles, the presence of beams and slabs above does not allow slipping a structural sleeve or tube over the columns and pushing them down into the water.

Figure 3:
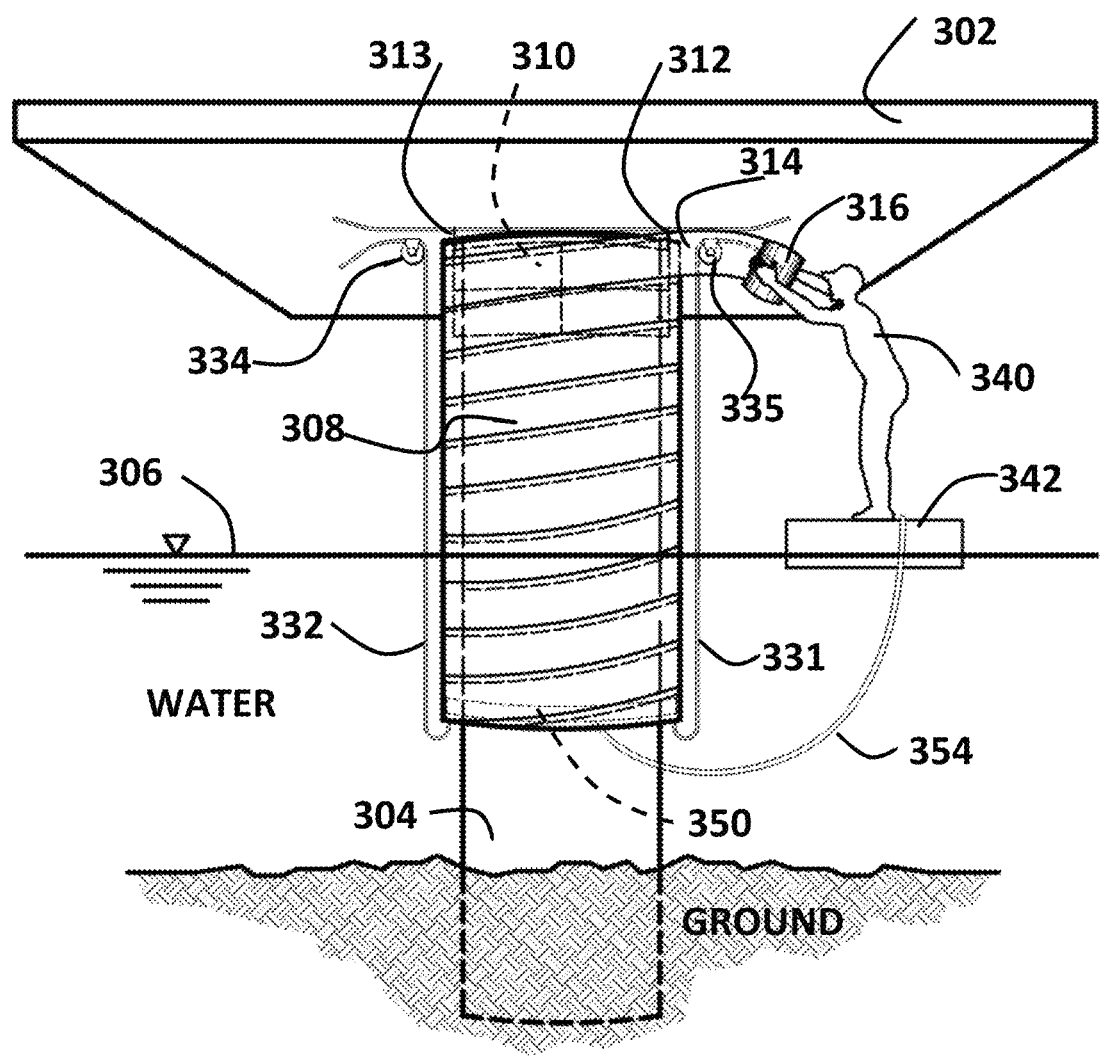
FIG. 3 shows a column partially submerged in water that is enclosed in a shell according to the disclosed methods.

Referring to FIG. 3, slab 302 supports a bridge, building or a wind turbine and the like and is supported on pile or column 304 which is partially submerged in water 306. The objective is to provide a continuous sleeve around this pile, covering substantially the full height of the column 304. A mandrel 310 of desired shape (circular, oval, rectangular, etc.) is provided. The mandrel 310 can be optionally supported by cables 312 and 313 from the structure 302 or secured with fasteners and/or clamps to the column 304. Various layers of resin-saturated carbon or glass FRP fabric 314 are wrapped helically or non-helically (in overlapping individual bands) around the mandrel 310. The fabric strip 314, in some embodiments, may be unwound from one or more spools 316 that can revolve around mandrel 310. In one embodiment the resin can cure very fast (for example in about 3 minutes at a temperature of 300 F). This allows the wrapped FRP layers to become a hard sleeve or tube 308 in a few minutes. In other embodiments, the resin can be cured when exposed to water and moisture, for example by spraying water on the wrapped fabric. This may be preferred for such repairs when the pile is submerged in water.

In this example, shell 308 is gradually lowered towards the bottom of the sea. Cables or ropes 331 and 332 can be attached to the bottom of the shell 308 to control the gradual motion of the shell. These cables 331 and 332 can, for example, be operated using pulleys 335 and 334, respectively. The construction crew 340 working on a barge or float 342 can operate the ropes and pulleys as well as the winding of the fabric strips 314. Alternatively, the winding of the fibers or fabric 314 may be performed mechanically or electrically with a winding machine or motor. Such equipment (not shown) can operate, for example, on a track attached to the underside of the structure 302. In some embodiments, the wrapping device may be attached to a cantilevered arm extending away from the float 342 that could travel all around the column on a track.

In some embodiments once the tube or shell 308 of the desired length is manufactured, its bottom is sealed and the intentional annular space between the shell 308 and the column 304 is filled with a filler material such as concrete, epoxy, grout, foam and the like. In other embodiments reinforcing elements such steel or FRP rods may also be attached to the column before or after formation of the shell as part of reinforcing of the column. One alternative for sealing the bottom of the shell 308 to prevent the grout from flowing out is to attach a bladder 350, similar to a bicycle tube, to the bottom of the shell 308. This bladder will be long enough to cover the entire perimeter of the column 304. A hose 354 may be attached to the bladder or inner tube 350 using an air valve (not shown). Once the shell 308 reaches the desired elevation, air is injected through the hose 354, causing the tube/bladder to expand and create a tight seal between the shell 308 and the column 304.

In various embodiments the mandrel can be inflatable allowing the user to inflate it to the desired shape and size while the FRP is being wrapped and then deflate it to allow easy removal of the finished shell. In some embodiments, the mandrel could be made of materials such as HDPE that inhibit bonding of resin saturated fabric to the mandrel. In other cases, the mandrel could be covered with a release film of non-sticky material such as mylar, etc. or sprayed on with non-sticky chemicals, known as bond brakers.

Another embodiment of the disclosed methods relates to encasement of pipes. In pipeline industry, there are times when a secondary sleeve is desired to be placed around the pipe. This sleeve serves as a containment pipe that can capture any fluids leaking from the host pipe which could cause harm to the environment. In other applications, the sleeve could be used to strengthen the host pipe or provide protection against blast loads. In another application, the encasement of an oil or gas pipe may be desirable to prevent thieves from illegally tapping into a pipe and stealing oil and gas. In such cases, slipping a continuous sleeve or pipe over the host pipe is impossible with the current state of art without cutting one or both ends of the pipe. In some cases the pipes being encased are buried in trenches and cannot be taken out of service and/or the annular space between the sleeve and the host pipe is required to be filled with a cooling liquid pressurized to, for example, 1000 psi. FIG. 4 shows how the disclosed methods can be used to solve such problems.

Figure 4A:
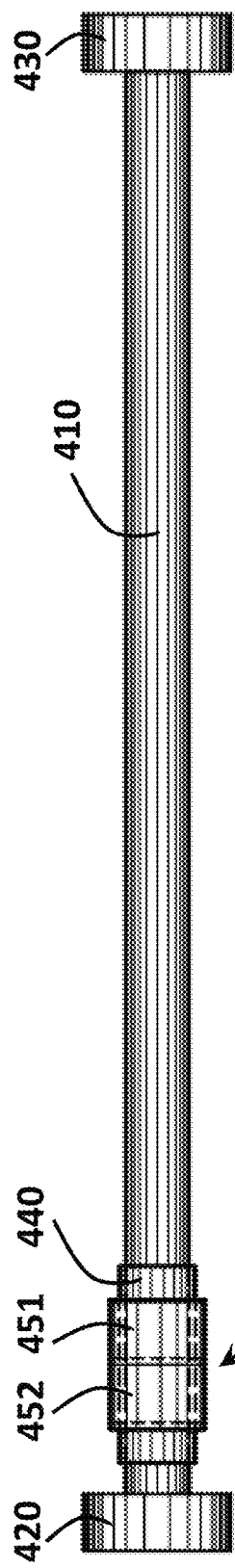
FIGS. 4A-4C illustrate the encapsulation of an example pipe segments by non-helical wrapping of FRP strips according to one of the embodiments of the disclosed methods.
Figure 4B:
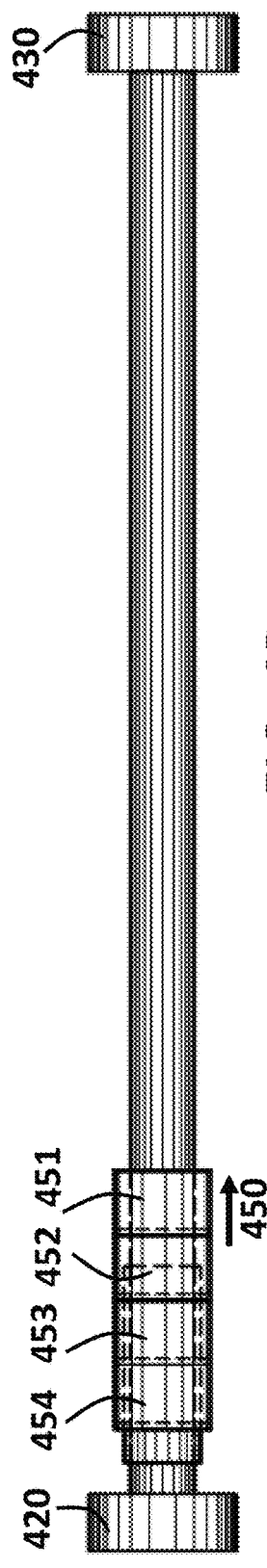

FIG. 4A shows the pipe 410 to be sleeved. This pipe 410 is connected to other pipes or flanges or valves 420 and 430 at both ends and could represent a segment of a very long pipeline. The segmental mandrel 440 is placed around the pipe 410 near the end where flange 420 exists. Strips of resin saturated carbon or glass FRP fabrics 451 and 452 are overlappingly wrapped non-helically (shown in FIG. 4) or helically (not shown) around the mandrel. These bands 451 and 452 are allowed to at least partially cure and create a shell 460. Curing of the resin can be expedited by heating the mandrel, applying UV light, spraying water on moisture-activated resins, and the like. The shell 460 which comprises FRP strips 451 and 452 is moved in the direction 450 towards the end where flange 430 exists, leaving a small portion of the shell 460 resting on the end of the mandrel 440. Additional FRP fabric layers 453 and 454 are wrapped, overlapping the previously wrapped FRP layers; the newly installed FRP layers 453 and 454 are allowed to at least partially cure (FIG. 4B).

Figure 4C:
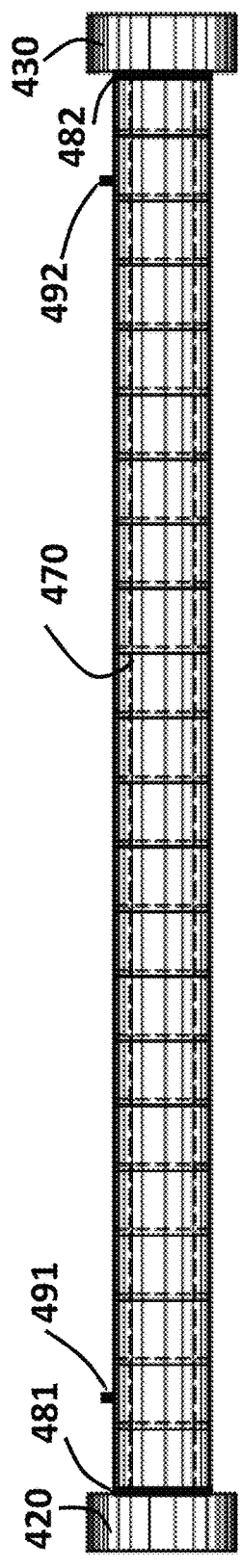

This process continues for as many times as necessary until a continuous seamless sleeve 470 is created (FIG. 4C). The ends 481 and 482 of the sleeve are sealed and secured onto the pipe 410. Mechanical clamps, epoxies, or expansive materials can be used to create a tight seal at these ends. Multiple injection ports such as 491 and 492 can be installed along the length of the sleeve 470 and used to fill the intentionally created annular space between the sleeve 470 and the host pipe 410 with a desirable filler material such as cooling liquid or gas. Such filler material can also be circulated with a pump to maintain its temperature and pressure as required by the pipe operators.

In other embodiments multiple segments of a pipe may be encapsulated with a single sleeve. For example, if the pipe segment 410 is 100 feet long, a single 500-ft long sleeve can encase 5 segments of such pipe. In these cases the internal diameter of the sleeve must be larger than the outside diameter of the flanges or supports 420 and 430 so these flanges will also be encapsulated within the 500-ft long sleeve.

Figure 5A:
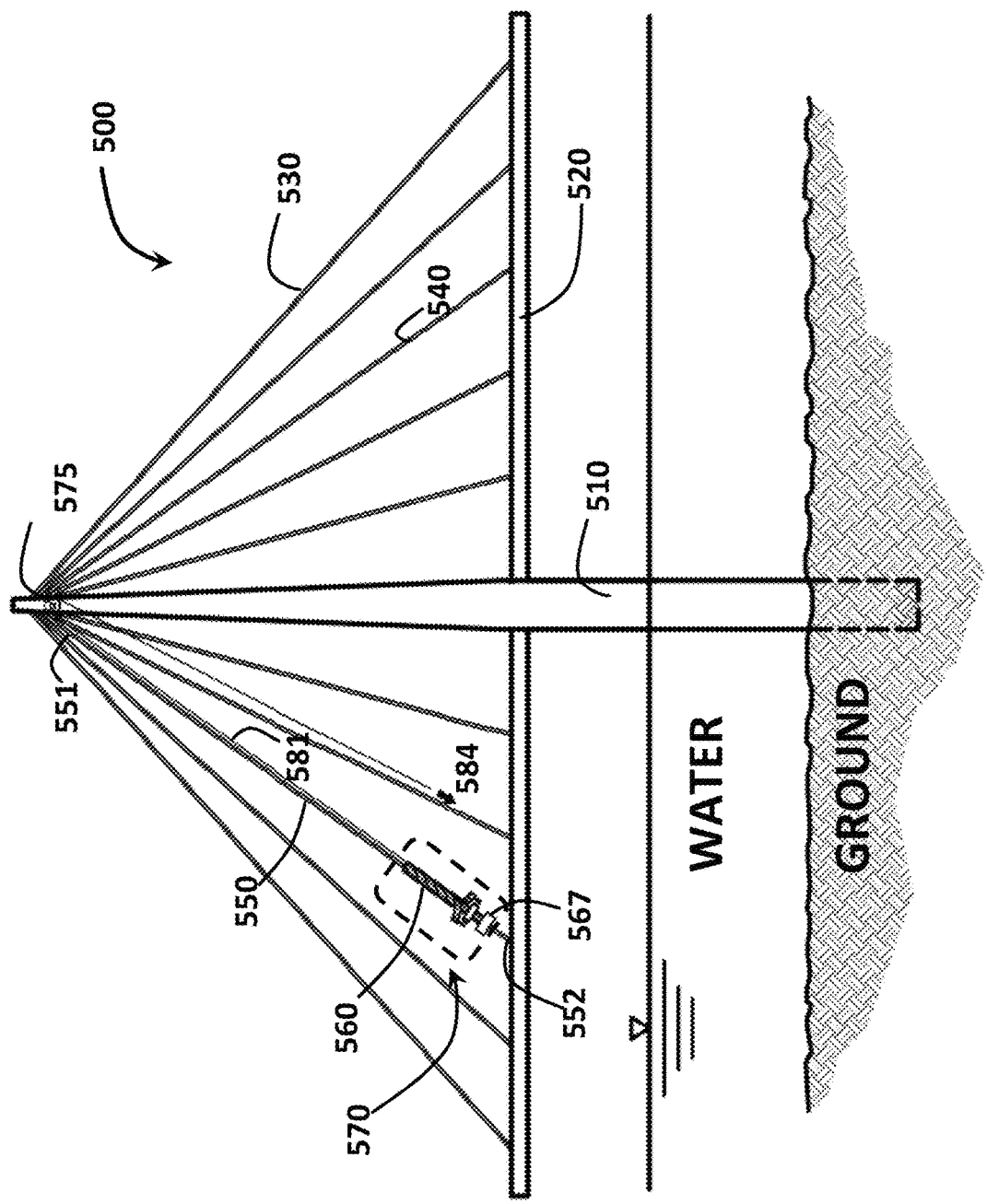
FIGS. 5A and 5B show encasing a cable in a bridge according to another example embodiment of the present disclosure.

Another example embodiment is illustrated in FIG. 5A where a cable-stay bridge 500 is supported on a main tower 510 and several cables such as 530, 540 and 550 support the bridge deck 520. These cables serve a primary function in supporting the traffic and dead load of the bridge and their corrosion with aging could result in failure of the bridge. To prevent corrosion of these cables, they are encapsulated in a seamless sleeve or tube that is filled with dehumidified air. When the sleeve deteriorates or gets damaged, the current state of technology does not offer a means to replace the deteriorated sleeve without disconnecting the cable from at least one end; this results in a hazardous situation and costly repair.

Figure 5B:
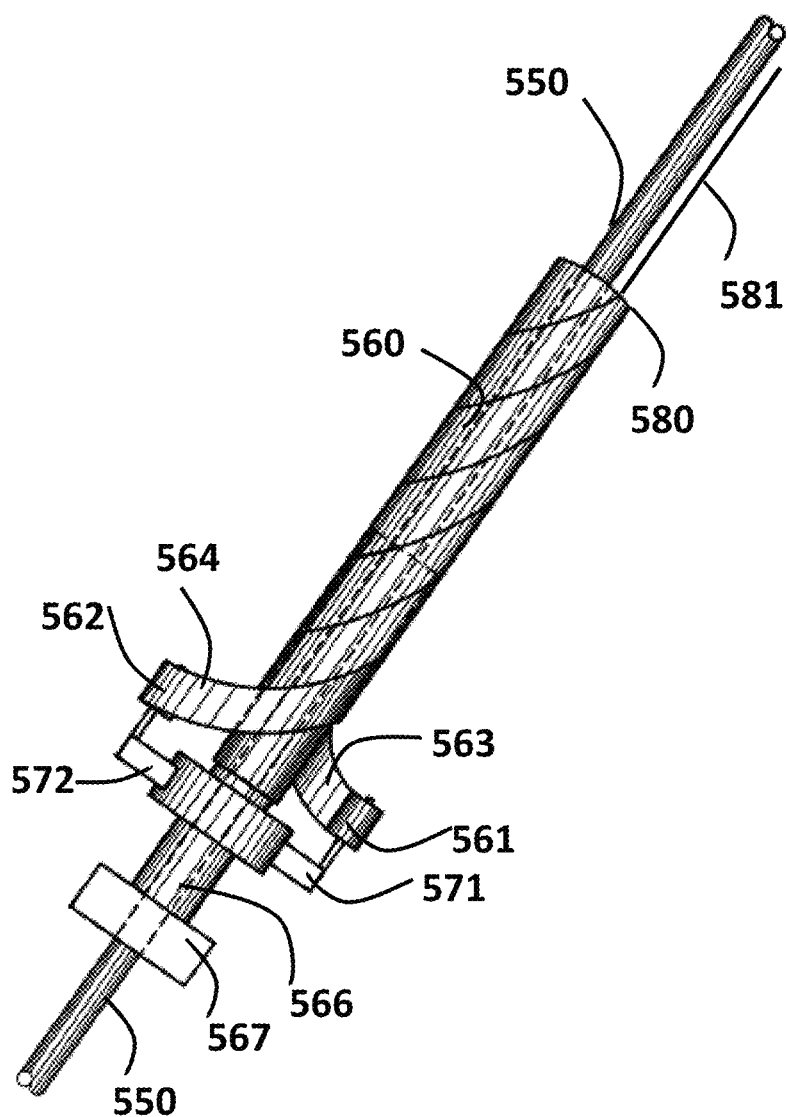

FIG. 5A illustrates an example cable 550 being encased in a continuous sleeve 560 according to the disclosed method. FIG. 5B shows a closeup view of the region 570 of FIG. 5A. In this example a segmental mandrel 566 is supported with an optional base 567 around the cable 550. One or more bands of FRP fabric 563 and 564 are helically and overlappingly wrapped around the mandrel 566. In some embodiments these fabric bands can be dispensed through spools 561 and 562, respectively. In various embodiments the spools 561 and 562 can be supported on arms 571 and 572, respectively that can rotate manually or automatically about the axis of the mandrel 566. The FRP is cured at least partially on the mandrel; the curing process in different embodiments may be expedited by heating the resin, using UV lights or water-activated resins that cure quickly once exposed to moisture or water. The steps of wrapping fabric and curing can continue as many times as required to build a sleeve 560 of the desired length.

In various embodiments the end 580 of the sleeve 560 may be attached to a cable 581. As shown in FIG. 5A, the cable 581 may be passed over a pulley 575 that is mounted on the main tower 510 near the high end 551 of cable 550. With such example arrangement the cable 581 can be pulled in the direction of the arrow 584, moving the finished sleeve 560 towards the end 551 of the cable 550. Once a sleeve of the desired length is manufactured, the ends of the sleeve may be sealed with a sealant, hose clamp, expansive grout and the like and the deliberately created annular space between the sleeve 560 and the cable 550 may be filled with dehumidified air or other fillers. In some embodiments a dehumidifier or pump may be used to circulate the air that is used to fill the annular space.

In various embodiments the wrapping of FRP layers around the mandrel may be done manually. In embodiments in which the wrapping is done mechanically, the process of the wrapping may be preprogrammed and the number of layers and the layer materials at each location along the sleeve may be automatically controlled by the program.

In various embodiments, the heating of the FRP sleeve and mandrel for curing of the resin may be done from outside or inside using light, heat, electrical current, chemical reaction, gas, etc. In some embodiments it is also possible to modify the resin, for example by introducing carbon nanotubes or other products, such that when an electrical current is introduced, the resin heats up and cures rapidly.

In some embodiments the resin used in this method is cured when exposed to UV light. Some resins in this category can cure in seconds. In other embodiments the curing of the sleeve or shell may be done while the sleeve is on the mandrel or after the sleeve is removed from the mandrel. For example, a string of UV lights may be placed outside the ES and when the sleeve is pulled away from the mandrel, the curing will continue or begin outside the ES. In yet other embodiments when a moisture-activated resin is used, once the FRP fabric is wrapped around the mandrel, spraying water on the FRP will initiate the curing process that can be completed in as little as one minute.

In various embodiments, the sleeve construction may include spacer materials such as 3D fabric, Coremat®, foam, or other products placed between or under or on top of the layers of FRP for additional rigidity (or increased ring stiffness). Those skilled in the art realize that the ability of a tube or sleeve to resist external loads is proportional to its ring stiffness. In various embodiments the number of layers and orientation of fibers in the FRP strips as well as the spacer materials will be designed by engineering calculations to ensure that the sleeve has the required strength to resist all internal and external loads including axial, flexure, shear, torsion along the axis of the sleeve or perpendicular to the axis of the sleeve.

In some installations as the sleeve is pulled over the ES, friction losses between the sleeve and the ES change the required strength of the sleeve along its length. The axial load on the sleeve will be largest near the end of the sleeve from where the sleeve is being pulled and it reduces to nearly zero at the tail of the sleeve, where it disengages the mandrel. In some embodiments the required amount of fibers, fiber specifications, and/or fiber direction(s) at different locations along the length of the sleeve are specifically designed to resist these loads. One of the advantages of the disclosed method and system is that the amount and/or the direction of these fibers can vary along the length of the sleeve to achieve the optimum strength at each location with little waste of materials.

In some embodiments when unidirectional fabric is wrapped around the mandrel, the angle of the wrapping of the fabric will allow engineers to calculate the component of the force resisted by the fabric in the hoop and longitudinal directions. In other embodiments, if a biaxial fabric with fibers in zero and ninety degree orientation is used, engineers can calculate the strength of the sleeve in longitudinal and hoop directions. By changing the angle of the helically-wrapped fabrics along the length of the sleeve and the number of wraps or the amount of overlap of each consecutive layer of fabric, the strength of the sleeve or casing can be modified along its length.

In some embodiments additional strips of FRP fabric can be placed along the length of the mandrel with the fibers aligned with the axis of the sleeve or tube. These fabrics contribute to the axial strength of the sleeve or tube that carries the weight of the sleeve. The number of these strips may vary along the length of the sleeve to achieve the optimum weight-carrying strength for the sleeve or tube.

A further advantage of the proposed methods is the small footprint on the construction site and the elimination of transporting and storage of larger pre-manufactured components to the job site. The proposed methods also minimize disruption to traffic and lane closures. These advantages will result in cost savings on the projects.

In some embodiments, the applied FRP sheets may be designed to be the sole reinforcing element of a pipe. Such FRP sheets can be placed as an internal layer within the finished thickness of the sleeve or as an external layer that will come in contact with the filler material when the sleeve is in service. These FRP sheets may include fibers in various x, y, and z directions (in plane and out of plane).

In some embodiments, a layer of paint or epoxy or other coatings such as polymers, polyurea, tar, etc. may be applied to the finished surface of the sleeve to seal it against moisture intrusion, UV resistance and the like. Yet in other embodiments, for example when the sleeve is used to encapsulate oil and/or gas pipes, such coating can protect the sleeve materials from chemical attack from the oil and gas.

In various embodiments sensors may be incorporated in the sleeve as it is being built or after it has been constructed. These sensors can monitor the stresses in the wall of the sleeve due to forces such as internal pressure, external loads, pulling force during installation, earthquake-induced stresses, etc. In some embodiments the sensors can monitor the conditions of the filler material and serve as a warning tool for the owners/operators of such systems. For example, if a cooling fluid or gas is placed in the annular space, these sensors can monitor the temperature and pressure of such fluids and gases. These stresses may be sent via wires, fiberoptic cable or wireless communication to a remote monitoring station.

Changes can be made to the claimed methods in light of the above Detailed Description. While the above description details certain embodiments of the disclosed methods and describes the best mode contemplated, no matter how detailed the above appears in text, the claimed methods can be practiced in many ways. Details of the system may vary considerably in its implementation details, while still being encompassed by the claimed methods disclosed herein.

Particular terminology used when describing certain features or aspects of the claimed methods should not be taken to imply that the terminology is being redefined herein to be restricted to any specific characteristics, features, or aspects of the claimed methods with which that terminology is associated. In general, the terms used in the following claims should not be construed to limit the claimed methods to the specific embodiments disclosed in the specification, unless the above Detailed Description section explicitly defines such terms. Accordingly, the actual scope of the claimed methods encompasses not only the disclosed embodiments, but also all equivalent ways of practicing or implementing the claimed methods.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B," and also the phrase "A and/or B" will be understood to include the possibilities of "A" or "B" or "A and B."

The above specification, examples, and data provide a complete description of the claimed methods. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of encasing an elongated structure in a jointless sleeve, wherein neither end of the structure is accessible or wherein no tube of any cross-section can be pulled over the structure from either end of the structure, the method comprising:
    assembling a mandrel around and close to one end of the elongated structure;
    wrapping at least one sheet and/or one strap of reinforced material around the mandrel to form a seamless sleeve segment, wherein the sheet and/or the strap of reinforced material is smeared with or saturated by resin;
    attaching said sleeve segment to a previously fabricated sleeve segment;
    moving, after resin is partially or completely cured, the sleeve segment and the attached segments towards an opposite end of the elongated structure; and
    repeating the wrapping, the attaching, and the moving steps as many times as necessary to encase a desired length of the elongated structure with a one-piece jointless and seamless sleeve.

2. The method of claim 1, wherein the mandrel is a segmental mandrel.

3. The method of claim 1, wherein the mandrel is slightly tapered to easily move and dispense manufactured sleeve segments.

4. The method of claim 1, wherein the mandrel is inflatable to be inflated to a desired shape and size for wrapping the at least one sheet and/or one strap of reinforced material and be deflated for removing the manufactured sleeve.

5. The method of claim 1, wherein the mandrel is covered with a release film of non-sticky material or is sprayed-on with non-sticky chemicals, known as bond brakers.

6. The method of claim 1, wherein wrapping the mandrel is performed with a pre-preg fabric to eliminate a need for carrying resin to construction site for saturating the fabric.

7. The method of claim 1, wherein the fabricated sleeve segment is moved at least partially off the mandrel by pushing or pulling.

8. The method of claim 1, wherein each sleeve segment is comprised of more than one layer of wrapping.

9. The method of claim 1, wherein wrappings are performed manually or mechanically or are preprogrammed.

10. The method of claim 1, wherein number of layers of wrapping is different at different locations along a length of the one-piece jointless and seamless sleeve to achieve different desired strengths at each desired location.

11. The method of claim 1, wherein the reinforced sheet or strap of material is Fiber Reinforced Polymer (FRP).

12. The method of claim 1, wherein an intentional annular space of a desired size is left between the one-piece jointless and seamless sleeve and the elongated structure.

13. The method of claim 12, further including the additional step of filling the annular space with filling materials that may also include reinforcing elements.

14. The method of claim 1, wherein the wrapping is performed helically or non-helically.

15. The method of claim 1, wherein additional sheets of different desired materials are placed between the wrappings.

16. The method of claim 1, wherein at least one controllable wheel, constantly or periodically, engages the sleeve to push or to pull the sleeve towards the opposite end of the elongated structure.

17. The method of claim 1, wherein sensor(s) are incorporated in the sleeve to monitor desired stresses in a wall of the sleeve.

18. The method of claim 17, wherein the sensors monitor stresses due to internal pressure, external loads, pulling force during installation, earthquake-induced stresses, conditions of the filler material as a warning tool for owners and operators of such systems, and temperature and pressure of fluids and gases inside the elongated structure.

19. A method of fabricating a shell around an extended structure, wherein a fabricated tubular shell cannot be pulled over the structure from either end of the structure, the method comprising:
 positioning a mandrel around and close to one end of the extended structure;
 wrapping, helically or non-helically, a sheet and/or a strap of resin smeared or resin saturated material around the mandrel to form a seamless shell segment;
 attaching the shell segment to a previously fabricated shell segment;
 moving the shell segment and the attached segments towards another end of the extended structure; and
 repeating the wrapping, the attaching, and the moving steps to encase a desired length of the extended structure with a one-piece jointless and seamless shell.

20. The method of claim 19, wherein an intentional annular space of a desired size is left between the shell and the extended structure to be filled with liquid, gas, solid, or curable filler material(s) and/or reinforcing elements.

* * * * *